United States Patent
McDonald et al.

(10) Patent No.: US 10,152,362 B2
(45) Date of Patent: *Dec. 11, 2018

(54) TECHNIQUES TO MODIFY A DOCUMENT USING A LATENT TRANSFER SURFACE

(71) Applicant: Microsoft Technology Licensing, LLC, Redmond, WA (US)

(72) Inventors: Paul McDonald, Redmond, WA (US); Eric Bailey, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,428

(22) Filed: Feb. 6, 2018

(65) Prior Publication Data

US 2018/0196704 A1 Jul. 12, 2018

Related U.S. Application Data

(63) Continuation of application No. 15/293,056, filed on Oct. 13, 2016, now Pat. No. 9,921,892, which is a (Continued)

(51) Int. Cl.
*G06F 9/54* (2006.01)
*G06F 17/21* (2006.01)
(Continued)

(52) U.S. Cl.
CPC ............ *G06F 9/543* (2013.01); *G06F 3/0482* (2013.01); *G06F 17/212* (2013.01); (Continued)

(58) Field of Classification Search
CPC ........ G06F 9/4443; G06F 9/543; G06F 9/541; G06F 17/24; G06F 17/2247; G06F 17/212; G06F 17/2264; G06F 3/0482
See application file for complete search history.

(56) References Cited

U.S. PATENT DOCUMENTS

| 5,579,521 A | 11/1996 | Shearer et al. |
| 5,581,670 A | 12/1996 | Bier et al. |

(Continued)

FOREIGN PATENT DOCUMENTS

| CN | 101038650 A | 9/2007 |
| JP | 201195394 A | 7/2001 |

(Continued)

OTHER PUBLICATIONS

"Gecko:Reftow Refactoring", Retrieved from: http://wiki.mozilla.org/Gecko:Reflow_Refactoring, Retrieved on: Oct. 23, 2007, 10 Pages.

(Continued)

*Primary Examiner* — Umut Onat
(74) *Attorney, Agent, or Firm* — Liang IP, PLLC

(57) ABSTRACT

In one implementation, a document having one or more content items is presented in a web browser to a user. A user input to select a content item in the displayed document and a transfer request to transfer the selected content item to the system cupboard are received. In response to the received transfer request, the content item is transformed in an editing surface embedded in the document from a source format of the content item into a target format compatible with the system clipboard. The content item transformed into the target format can then be transferred to the system clipboard.

20 Claims, 6 Drawing Sheets

Related U.S. Application Data continuation of application No. 12/110,351, filed on Apr. 28, 2008, now Pat. No. 9,507,651.

(51) Int. Cl.
  *G06F 17/22* (2006.01)
  *G06F 3/0482* (2013.01)
  *G06F 17/24* (2006.01)

(52) U.S. Cl.
  CPC ...... *G06F 17/2247* (2013.01); *G06F 17/2264* (2013.01); *G06F 17/24* (2013.01)

(56) References Cited

U.S. PATENT DOCUMENTS

| | | |
|---|---|---|
| 5,604,858 A | 2/1997 | Jefferson et al. |
| 5,617,114 A | 4/1997 | Bier et al. |
| 5,924,099 A | 7/1999 | Guzak et al. |
| 6,278,678 B1 | 8/2001 | Iida |
| 6,662,186 B1 | 12/2003 | Esquibel et al. |
| 6,986,105 B2 | 1/2006 | Walker, Jr. |
| 7,000,184 B2 | 2/2006 | Matveyenko et al. |
| 7,124,360 B1 | 10/2006 | Drenttel et al. |
| 7,191,405 B1 | 3/2007 | Jaramillo |
| 7,259,753 B2 | 8/2007 | Keely et al. |
| 7,278,092 B2 | 10/2007 | Krzanowski |
| 7,554,576 B2 | 6/2009 | Erol et al. |
| 7,574,048 B2 | 8/2009 | Shilman et al. |
| 7,793,231 B2 | 9/2010 | Berstis et al. |
| 8,266,524 B2 * | 9/2012 | Bailey ............... G06F 17/30893 715/234 |
| 9,507,651 B2 * | 11/2016 | McDonald ............... G06F 9/543 |
| 9,921,892 B2 * | 3/2018 | McDonald ............... G06F 9/543 |
| 2001/0021935 A1 | 9/2001 | Mills |
| 2002/0069204 A1 | 6/2002 | Kahn et al. |
| 2002/0078105 A1 | 6/2002 | Hamada et al. |
| 2002/0099717 A1 | 7/2002 | Bennett |
| 2003/0229845 A1 | 12/2003 | Salesin et al. |
| 2003/0233614 A1 | 12/2003 | Mohamed |
| 2004/0044966 A1 | 3/2004 | Malone |
| 2004/0070607 A1 | 4/2004 | Yalovsky et al. |
| 2004/0143788 A1 * | 7/2004 | Aureglia ............... G06F 17/246 715/215 |
| 2004/0205488 A1 | 10/2004 | Fry |
| 2004/0210822 A1 | 10/2004 | Kotler et al. |
| 2004/0260535 A1 * | 12/2004 | Chen ............... G06F 9/543 704/9 |
| 2004/0268235 A1 | 12/2004 | Wason |
| 2005/0034060 A1 | 2/2005 | Kotler et al. |
| 2005/0044486 A1 | 2/2005 | Kotler et al. |
| 2005/0044496 A1 | 2/2005 | Kotler et al. |
| 2005/0044497 A1 | 2/2005 | Kotler et al. |
| 2005/0050088 A1 | 3/2005 | Kotler et al. |
| 2005/0055626 A1 | 3/2005 | Kotler et al. |
| 2005/0066265 A1 | 3/2005 | Kotler et al. |
| 2005/0102629 A1 | 5/2005 | Chen et al. |
| 2005/0125377 A1 | 6/2005 | Kotler et al. |
| 2005/0134906 A1 | 6/2005 | Takashima |
| 2005/0193321 A1 | 9/2005 | Iwema et al. |
| 2005/0262439 A1 | 11/2005 | Cameron |
| 2006/0050969 A1 | 3/2006 | Shilman et al. |
| 2006/0053383 A1 | 3/2006 | Gauthier et al. |
| 2006/0075353 A1 | 4/2006 | Despain et al. |
| 2006/0077494 A1 | 4/2006 | Kanzaki et al. |
| 2006/0080369 A1 * | 4/2006 | Razdow ............... G06F 17/2229 |
| 2006/0095836 A1 | 5/2006 | Ono et al. |
| 2006/0101139 A1 | 5/2006 | Hornreich et al. |
| 2006/0155821 A1 | 7/2006 | Pichetti et al. |
| 2006/0242145 A1 | 10/2006 | Krishnamurthy et al. |
| 2006/0277460 A1 | 12/2006 | Forstall et al. |
| 2007/0028166 A1 | 2/2007 | Hundhausen et al. |
| 2007/0150477 A1 | 6/2007 | Barsness et al. |
| 2007/0288859 A1 | 12/2007 | Vuong et al. |
| 2008/0098301 A1 | 4/2008 | Black et al. |
| 2008/0112013 A1 | 5/2008 | Ferlitsch et al. |
| 2008/0177623 A1 | 7/2008 | Fritsch et al. |
| 2008/0209311 A1 | 8/2008 | Agronik et al. |
| 2008/0282180 A1 | 11/2008 | Glasgow et al. |
| 2009/0055755 A1 | 2/2009 | Hicks et al. |
| 2009/0094514 A1 * | 4/2009 | Dargahi ............... G06F 17/24 715/255 |

FOREIGN PATENT DOCUMENTS

| | | |
|---|---|---|
| JP | 2003037677 A | 2/2003 |
| JP | 2007004784 A | 1/2007 |
| JP | 2007506987 A | 3/2007 |
| JP | 2007535028 A | 11/2007 |
| RU | 2263954 C2 | 11/2005 |
| WO | 2005091904 A | 10/2005 |

OTHER PUBLICATIONS

"LAPIS—Quick Start Instructions", Retrieved from: http://web.archive.org/web/20121007075722/http://groups.csail.mit.edu/uid/lapis/quickstart.html, 2012, 2 Pages.

"Rich Text Editor", Retrieved from: http://web.archive.org/web/20161227020407/https://developer.yahoo.com/yui/editor/, Retrieved on: Oct. 23, 2007, 7 Pages.

"Notice of Allowance Issued in European Patent Application No. 09739385.4", dated Jun. 22, 2016, 7 Pages.

"Search Report Issued in European Patent Application No. 09739385.4", dated Mar. 8, 2013, 7 Pages.

"Notice of Allowance Issued in Korean Patent Application No. 10-2010-7021155", dated Feb. 26, 2015, 2 Pages.

"Office Action Issued in Korean Patent Application No. 10-2010-7021155", dated Oct. 29, 2014, 5 Pages.

"First Office Action Issued in Korean Patent Application No. 10-2010-7023870", dated Dec. 23, 2014, 9 Pages.

"Fourth Office Action Issued in Korean Patent Application No. 10-2010-7023870", dated Oct. 20, 2016, 4 Pages.

"Notice of Allowance Issued in Korean Patent Application No. 10-2010-7023870", dated Jun. 20, 2017, 3 Pages. (W/o English Translation).

"Second Office Action Issued in Korean Patent Application No. 10-2010-7023870", dated Jun. 30, 2015, 4 Pages.

"Third Office Action Issued in Korean Patent Application No. 10-2010-7023870", dated Sep. 11, 2015, 10 Pages.

"Final Office Action Issued in U.S. Appl. No. 12/037,059", dated Jan. 19, 2012, 10 Pages.

"Non-Final Office Action Issued in U.S. Appl. No. 12/037,059", dated Dec. 28, 2010, 8 Pages.

"Non-Final Office Action Issued in U.S. Appl. No. 12/037,059", dated Jul. 28, 2011, 11 Pages.

"Notice of Allowance Issued in U.S. Appl. No. 12/037,059", dated Apr. 23, 2012, 8 Pages.

"Supplemental Notice of Allowance Issued in U.S. Appl. No. 12/037,059", dated Aug. 17, 2012, 2 Pages.

"Final Office Action Issued in U.S. Appl. No. 12/110,351", dated Jan. 1, 2015, 27 pages.

"Final Office Action Issued in U.S. Appl. No. 12/110,351", dated Mar. 2, 2016, 44 Pages.

"Final Office Action Issued in U.S. Appl. No. 12/110,351", dated Jan. 15, 2015, 26 Pages.

"Final Office Action Issued in U.S. Appl. No. 12/110,351", dated Nov. 18, 2013, 23 pages.

"Final Office Action Issued in U.S. Appl. No. 12/110,351", dated Dec. 21, 2011, 19 Pages.

"Non-Final Office Action Issued in U.S. Appl. No. 12/110,351", dated Apr. 25, 2013, 23 Pages.

"Non-Final Office Action Issued in U.S. Appl. No. 12/110,351", dated Jul. 20, 2015, 35 Pages.

"Non-Final Office Action Issued in U.S. Appl. No. 12/110,351", dated Jul. 21, 2011, 17 Pages.

"Non-Final Office Action Issued in U.S. Appl. No. 12/110,351", dated Jun. 20, 2014, 24 Pages.

"Notice of Allowance Issued in U.S. Appl. No. 12/110,351", dated Jul. 19, 2016, 23 Pages.

(56) References Cited

OTHER PUBLICATIONS

"Non-Final Office Action In U.S. Appl. No. 15/293,056", dated Jul. 12, 2017, 29 Pages.
"Notice of Allowance Issued in U.S. Appl. No. 15/293,056", dated Nov. 11, 2017, 16 Pages.
"Notice of Allowance Issued in Canadian Patent Application No. 2,712,925", dated Jun. 16, 2016, 1 Page.
"Office Action Issued in Canadian Patent Application No. 2,712,925", dated Aug. 4, 2015, 4 Pages.
"Office Action Issued in Canadian Patent Application No. 2,712,925", dated Jan. 13, 2016, 4 Pages.
"Notice of Allowance Issued in Canadian Patent Application No. 2,718,119", dated Mar. 29, 2016, 1 Page.
"Office Action Issued in Canadian Patent Application No. 2,718,119", dated Sep. 21, 2015, 5 Pages.
"Notice of Allowance Issued in Australian Application No. 2009217633", dated Jan. 2, 2014, 2 Pages.
"Office Action Issued in Australian Patent Application No. 2009217633", dated Oct. 21, 2013, 3 Pages.
"Notice of Allowance Issued in Australian Application No. 2009241481", dated May 22, 2014, 2 Pages.
"Office Action Issued in Australian Patent Application No. 2009241481", dated Mar. 27, 2014, 3 Pages.
"First Office Action Issued in Chinese Patent Application No. 200980106644.6", dated Feb. 16, 2012, 9 Pages.
"Notice of Allowance Issued in Chinese Application No. 200980106644.6", dated Jan. 15, 2013, 4 Pages.
"Second Office Action Issued in Chinese Patent Application No. 200980106644.6", dated Oct. 9, 2012, 6 Pages.
"First Office Action Issued in Chinese Patent Application No. 200980115711.0", dated Mar. 30, 2012, 10 Pages.
"Notice of Allowance Issued in Chinese Patent Application No. 200980115711.0", dated Apr. 25, 2013, 4 Pages.
"Second Office Action Issued in Chinese Patent Application No. 200980115711.0", dated Nov. 13, 2012, 8 Pages.
"Notice of Allowance Issued in Russian Patent Application No. 2010135522", dated Apr. 2, 2013, 19 Pages.
"Office Action Issued in Russian Patent Application No. 2010135522", dated Dec. 28, 2012, 4 Pages.(W/o English Translation).
"Notice of Allowance Issued in Russian Patent Application No. 2010144041", dated Aug. 30, 2013, 16 pages.
"Office Action Issued in Russian Patent Application No. 2010144041", dated Feb. 7, 2011, 3 Pages.(W/o English Translation).
"Office Action Issued in Russian Patent Application No. 2010144041", dated Apr. 2, 2013, 4 Pages. (W/o English Translation).
"Final Rejection Issued in Japanese Patent Application No. 2010-547664", dated May 10, 2013, 7 Pages.
"Notice of Allowance Issued in Japanese Patent Application No. 2010-547664", dated Feb. 18, 2014, 22 Pages.
"Office Action Issued in Japanese Patent Application No. 2010-547664", dated Jan. 11, 2013, 9 Pages.
"Final Rejection Issued in Japanese Patent Application No. 2011-507516", dated Dec. 4, 2013, 4 Pages.
"Notice of Allowance Issued in Japanese Application No. 2011-507516", dated Apr. 28, 2014, 4 Pages.
"Office Action Issued in Japanese Patent Application No. 2011-507516", dated Feb. 5, 2013, 6 Pages.

"Office Action Issued in Israel Patent Application No. 207097", dated Jul. 18, 2013, 6 Pages.
"Office Action Issued in Israel Patent Application No. 207097", dated Dec. 25, 2014, 2 Pages. (W/o English Translation).
"First Office Action Issued in Israel Patent Application No. 208050", dated Oct. 10, 2013, 6 Pages.
"Second Office Action Issued in Israel Patent Application No. 208050", dated Jan. 19, 2015, 2 Pages. (W/o English Translation).
"Office Action Issueed in indian Patent application No. 2161/MUMNP/2010", dated Apr. 16, 2018, 7 Pages.
Apperley, et al., "Breaking the copy/paste cycle: the Stretchable Selection Tool", In Proceedings of the First Australasian User Interface Conference, Jan. 31, 2000, pp. 3-10.
Bateman, et al., "Oats: The open Annotation and Tagging System", In Proceedings of the Third Annual International Scientific Conference of the Learning Object Repository Research Network, 2006, 10 Pages.
Hokugou, Tatsurou, "Start of 'Integration Era' of WWW and Desktop; heated future generation platform scramble for implementation of WaaC", In Proceedings of the Nikkei Electronics, No. 953, Jun. 4, 2007, pp. 85-92.
Hoshino, Jun, "Prepare for digital document revolution! Through verification of ability of Acrobat 4.0", In Proceedings of the Nikkei Mac, vol. 7, Issue 8, Jul. 18, 1999, 8 Pages.
Imura, Katsuya, "Illustrator CS3 Super Reference for Windows", In Proceedings of the Sotec Corporation, First Edition, Jul. 15, 2007, pp. 2-4.
Mizuno, Takaaki, "Thorough Research on [SaaS], Part 4, Web2.0 SaaS [Office Application] Checking the performance of Office SaaS", In Proceedings of the Computerworld Get Technology Right, vol. 3, Issue 10, Oct. 1, 2006, pp. 2-10.
"Notice of Allowance Issued in Mexican Application No. MX/a/2010/009102", dated Feb. 27, 2014, 1 Page. (W/o English Translation).
"Office Action Issued in Mexican Patent Application No. MX/a/2010/009102", dated Jun. 13, 2013, 2 Pages. (W/o English Translation).
"Notice of Allowance Issued in Mexican Patent Application No. MX/a/2010/011403", dated Jan. 14, 2015, 1 Page.
"International Search Report & Written Opinion Issued in PCT Application No. PCT/US2009/031482", dated Jun. 1, 2009, 11 Pages.
"International Search Report and Written Opinion Issued in PCT Application No. PCT/US2009/039388", dated Nov. 17, 2009, 12 Pages.
"Notice of Allowance Issued in Malaysian Patent Application No. PI 20100003577", dated Apr. 15, 2015, 3 Pages.
Shimoda, Kenichi, "Introduction of Long-awaited Japanese version!, Investigation on the performance of Adobe Reader for Palm OS 3.0 Japanese Version", In Proceedings of the Palm Magazine, vol. 20, Nov. 14, 2003, pp. 2-5.
Stone, M. David., "The Office Clipboard", In Proceedings of the PC Magazine, Dec. 2001, pp. 1-3.
Tokix, "Website Explorer, 'Zoho' offering multiple Web applications available online", In Proceedings of the PC Japan, vol. 12, Issue 11, Nov. 1, 2007, pp. 2-7.
Williams, Eric, "How to Create an HTML Editor for asp.net AJAX", Copyright Eric Williams, 2007, pp. 1-9.

* cited by examiner

400

```
EMBED A LATENT TRANSFER SURFACE IN A DOCUMENT
402
```

```
RECEIVE A TRANSFER REQUEST TO TRANSFER MEDIA
CONTENT FOR THE DOCUMENT
404
```

```
TRANSFER THE MEDIA CONTENT USING THE LATENT
TRANSFER SURFACE IN RESPONSE TO THE TRANSFER
REQUEST
406
```

STORAGE MEDIUM 602

LOGIC 604

TECHNIQUES TO MODIFY A DOCUMENT USING A LATENT TRANSFER SURFACE

CROSS-REFERENCE TO RELATED APPLICATION

This application is a continuation application of U.S. patent application Ser. No. 15/293,056, filed Oct. 13, 2016, now U.S. Pat. No. 9,921,892, issued on Mar. 30, 2018, which is a continuation application of U.S. patent application Ser. No. 12/110,351, filed Apr. 28, 2008, now U.S. Pat. No. 9,507,651, issued on Nov. 29, 2016, which is related to commonly owned U.S. patent application Ser. No. 12/037,059 titled "EDITING A DOCUMENT USING A TRANSITORY EDITING SURFACE," and filed on Feb. 25, 2008, now U.S. Pat. No. 8,266,524, issued on Sep. 11, 2012, the entirety of which is hereby incorporated by reference.

BACKGROUND

Application programs, such as word processing application programs, have traditionally been stand-alone software programs installed on a personal computer that provide rich editing and formatting functionality for documents stored in local or network-based files. These application programs are generally very large, requiring many megabytes of drive space to install. The recent trend, however, is for collaborative development of documents by remotely diverse users who may not have access to the same stand-alone application programs and where the documents may be stored on remote networks accessible over the Internet. This has led to the development of application programs that can be delivered via a conventional World Wide Web ("web") browser, thereby allowing remote documents to be edited by users over a network without the need to install a traditional stand-alone application program.

One technique for providing web-based application program functionality involves developing web pages that utilize editing features available in many web browser programs. This technique has the advantage of being small and fast with little development effort. The limited editing features provided by these web browsers, however, generally cannot compare with the feature rich capabilities of traditional stand-alone application programs. Further, the editing features available may vary among the different web browser programs, thereby making it difficult to provide a consistent user experience across all web browsers.

Another technique for providing web-based application program functionality is to implement a complete application program that is executed within a browser using a cross-browser runtime technology such as JAVA from SUN MICROSYSTEMS, FLASH from ADOBE SYSTEMS, or Asynchronous JAVASCRIPT and XML ("AJAX"). While allowing the developer complete control over the features and capabilities of the application program, this method generally involves a considerable development effort and requires implementation of low level editing functionality, such as the rendering of text in a window as typed by the user, the movement of a blinking cursor through the text, or the constant reflow of the contents of the window the user types. In addition, because the application program is executed in a browser-based runtime technology, it is often slow in execution and may not be able to provide an adequately responsive user interface.

It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for modifying, changing or otherwise editing a document over a network from a remote device. In one embodiment, for example, an apparatus may comprise a client device having a web browser. The client device may retrieve an application program from a server over a network using the web browser, and execute the application program at the client device to present the document using a web browser window. A user may then edit the document via the web browser window, and once modified, store the modified document at the server.

The client device may use a novel and enhanced document editing subsystem to generally manage edit operations for a document. In one embodiment, for example, the document editing subsystem may comprise a transfer surface creation module operative to embed a latent transfer surface in the document. A transfer control module may be communicatively coupled to the transfer surface creation module. The transfer control module may be operative to receive a transfer request to transfer media content for the document, and transfer the media content using the latent transfer surface in response to the transfer request. Examples of transfer requests may include without limitation copy transfer requests, cut transfer requests, paste transfer requests, paste special transfer requests, and so forth. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a logic flow.
FIG. 6 illustrates an embodiment of an article.

DETAILED DESCRIPTION

Figure 1:
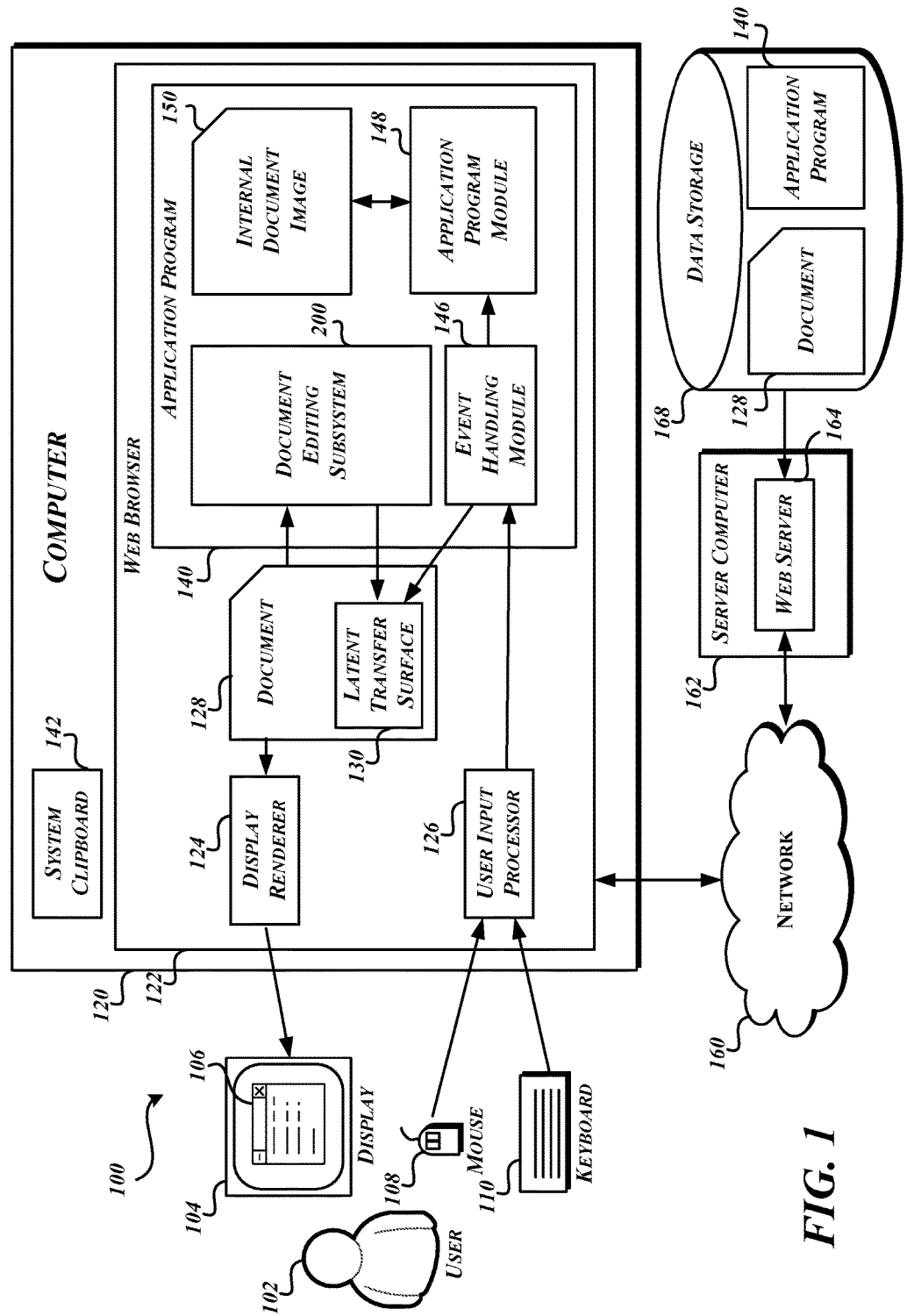
FIG. 1 illustrates an embodiment of a first system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are generally directed to server-based or web-based application programs arranged for execution by a client device using a suitable communications interface such as a web browser. Web-based application programs allow operators to create and edit documents online from a client device without the need for stand-alone application programs to be implemented by the client device. Further, web-based application programs allow collaboration in real-time with other operators.

The application programs may include any type of application program capable of creating, modifying, processing and otherwise managing documents. Examples of documents may include without limitation word processing documents, spreadsheet documents, personal information manager documents, presentation documents, note documents, database documents, publishing documents, data entry documents, diagram documents, project documents, form documents, Internet documents, markup language documents, hypertext markup language (HTML) documents, extensible HTML (XHTML), extensible markup language (XML) documents, generalized markup language (GML) documents, standard GML (SGML) documents, lightweight markup language (LML) documents, user interface markup language (UTML), vector graphics markup language (VGML) documents, web-based documents, online documents, web page, and so forth. Examples of application programs may include without limitation any of the application programs included with the MICROSOFT® OFFICE productivity suite made by MICROSOFT Corporation, Redmond, Wash. In one embodiment, for example, the application program may comprise a word processing program, such as MICROSOFT WORD. The MICROSOFT WORD application program may be implemented as a web-based application program provided by MICROSOFT OFFICE LIVE or GOOGLE® APPS. The embodiments, however, are not limited to this example.

In one embodiment, an application program such as a word processing program is implemented in a cross-browser runtime technology and provides a rich set of editing features comparable to that of traditional stand-alone word processing programs. The editing features may include any commands, instructions or directives that involve the transfer of media content between various endpoints. Examples of editing features may include without limitation copy commands, cut commands, paste commands, paste special commands, and so forth. Examples of transfers between various endpoints may include without limitation the transfer of media content between a document and a system clipboard, between two different documents, between application programs, between a system program and an application program, between software objects, and so forth. The application program may implement the editing features using a document editing subsystem designed to support the application program. The document editing subsystem may be implemented in various parts of a network, such as part of a web-based application program executed by a server, a web-based application program executed by a client device, a communications interface such as a web browser, another network accessible or client accessible device, or a combination of such options.

Conventional web-based editing tools are unsatisfactory for a number of reasons. For example, existing web-based editing tools typically have limited capabilities for implementing editing features, particularly with respect to importing and exporting data to a system clipboard. This is due in part to security restrictions imposed by the web browser itself. Editing documents is therefore reliant on the editing commands provided by the web browser. For example, when an editable HTML surface is provided to the user, any arbitrary media content can then be pasted into the surface. In this case, the word processing program has limited control over the style, formatting, and layout of the arbitrary media content pasted in by an operator. Further, it is difficult to detect such editing operations, and filtering the content that works well in all web browsers and is used by existing applications. Similar problems exist for copying media content into the system clipboard. The selection model used by a web browser is typically limited. For example, an operator cannot make simultaneous selections of different parts of a document, or make a selection that spans across any embedded content such as an Inline Frame (IFrame). Further, the media content copied from a source document (e.g., a document rendered as a web page) may not be in a suitable format for a target endpoint.

To solve these and other problems, the embodiments include a document editing subsystem arranged to provide an enhanced set of editing features comparable to a stand-alone word processing program. Rather than using the editing features provided by the web browser to implement the low level editing functionality, a word processing program may utilize a document editing subsystem to implement various editing features. In particular, the document editing subsystem may utilize a latent transfer surface to implement the various editing features. The latent transfer surface is embedded in a document and hidden from view by an operator. The latent transfer surface may be used as an intermediate storage structure for media content being transferred between a document and a system clipboard. In one aspect, the latent transfer surface may be implemented as a HTML IFRAME element, among others.

According to one aspect presented herein, a document within a web browser may be edited using the latent transfer surface. In this regard, a word processing program executing in the web browser displays the document in a browser window. Whenever the document editing subsystem receives an edit request (e.g., cut transfer request, copy transfer request, paste transfer request, paste special transfer request, etc.), it utilizes the embedded latent transfer surface to facilitate or perform the edit request. In general, the document editing subsystem transfers media content to the latent transfer surface, processes the media content, and then transfers the processed media content to the target object (e.g., a document or system clipboard). The intermediate processing stage allows selected media content to be transformed or translated into various formats suitable for a target endpoint, such as a system clipboard in response to a copy transfer request or a cut transfer request, a document in response to a paste transfer request or a paste special request, and so forth. The embodiments are not limited in this context.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

FIG. 1 illustrates a block diagram for a system 100. The system 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

The embodiment illustrated in FIG. 1 shows varying aspects of a system 100 for editing a document using a latent transfer surface 130. The system 100 includes a computer 120 comprising a standard desktop or laptop computer system capable of executing an operating system and one or more application programs. The computer 120 is operatively connected to a display 104, mouse 108, and keyboard 110 to allow a user 102 to interact with system and application programs executing on the computer 120. The computer 120 is interconnected to a server computer 162 through one or more local and wide area networks, such as the network 160. It should be appreciated that many more network connections may be utilized than illustrated in FIG. 1.

The computer 120 is operative to execute a web browser 122 that is operatively connected via the network 160 to a web server 164 executed by the server computer 162. In one embodiment, the web browser 122 is an application program capable of displaying HTML documents, such as INTERNET EXPLORER® from MICROSOFT CORPORATION, FIREFOX from MOZILLA, SAFARI from APPLE, INC., and others. It will be appreciated by one of ordinary skill in the art, however, that any type of application program capable of rendering a markup language and executing script logic may be utilized to embody the web browser 122. The server computer 162 may operate as a web server and includes any software program capable of serving documents to a web browser 122. The server computer 162 is further connected to a data storage 168 containing documents and an application program 140, which will be described in more detail below. According to one embodiment, the documents may include a document 128 to be served to the web browser 122. For example, the document 128 may comprise an HTML document rendered by the web browser 122. Upon request by a user 102 of the computer 120, the web browser 122 is operative to retrieve the document 128 from the web server 164 and render it in a window 106 on the display 104 for presentation to the user 102.

As discussed briefly above, the system 100 also includes an application program 140, such as a word processing program. The application program 140 is operative to allow the user 102 of the computer 120 to edit the contents of the document 128 in the window 106. According to one embodiment, the application program 140 is capable of executing within a runtime environment provided by the web browser 122. For example, the application program 140 may be created using AJAX development techniques.

In one embodiment, the application program 140 is retrieved from the web server 164 along with the document 128 to be edited. In alternative embodiments, the application program 140 may reside locally on the computer 120. The application program 140 includes an application program module 148 which comprises application logic operative to provide a given set of functionality (e.g., word processing) to the user 102. In one embodiment, the application program 140 maintains the contents of the document being edited in an internal document image 150. In other embodiments, the application program 140 maintains the contents of the document being edited directly within the document 128. The display renderer 124 renders the document 128 for display. For example, the display renderer 124 may be implemented as an HTML renderer.

In one embodiment, the application program 140 includes event handling module 146, which monitors for user input events from user input processor 126. As will be described in detail below in regard to FIG. 2, the event handling module 146 is operative to detect the placement and movement by the user 102 of an insertion pointer at one or more locations within the document 128 as displayed in the window 106. The event handling module 146 is further operative to monitor user input events during the editing of the document's contents. For example, the event handling module 146 may detect the selection of portions or multiple portions of media content within the document 128 in preparation of an edit command.

The computer 120 may use an enhanced document editing subsystem 200 arranged to generally manage edit operations and edit features for a document, such as document 128. In particular, the document editing subsystem 200 may utilize a latent transfer surface 130 to support or implement the various editing features. The document editing subsystem 200 embeds the latent transfer surface 130 into the document 128 in a way that keeps it invisible or hidden from view by the user 102. The document editing subsystem 200 may use the latent transfer surface 130 as an intermediate storage structure for media content being transferred between the document 128 and a system clipboard.

The latent transfer surface 130 may comprise any editable frame suitable for use with a given markup language used by the display renderer 124 to render the document 128 in the browser window 106 on the display 104 for presentation to the user 102. Further, the latent transfer surface is hidden, latent or invisible so the user 102 cannot view or perceive the editable frame while viewing the document 128 in the browser window 106. In one embodiment, for example, the latent transfer surface 130 may be implemented as a HTML IFRAME element, among others. Any editable frame that is invisible to the user 102 and suitable for use with a particular document may be used as the latent transfer surface 130. The embodiments are not limited in this context.

The latent transfer surface 130 may be used as a depository or temporary storage for media content that the user 102 pastes into the document 128, and a place to render selected content for a copy or cut command. Using an invisible or latent transfer surface 130 allows each document 128 to temporarily store media content being transferred to the document 128 or from the document 128. The document editing subsystem 200 can monitor the latent transfer surface 130, and detect when media content has been deposited into the latent transfer surface 130. The document editing subsystem 200 can then transform or translate the media content stored by the latent transfer surface 130 into a format suitable for the target endpoint (e.g., a system clipboard or document). In this manner, the document editing subsystem 200 and the latent transfer surface 130 allow the application program 140 control over the formatting of media content being inserted into the document 128 from the system clipboard 142 using a paste command or paste special command, as well as being copied or moved from the document 128 to the system clipboard 142 using a copy command or cut command. The distinction between this type of model, and the default behavior provided by the editing features implemented for a typical web browser, is that the document editing subsystem 200 maintains complete control over the selected media content, which allows the document editing subsystem 200 to manipulate the style, formatting, layout, and other formatting aspects of the media content, rather than being restricted to those editing features and controls provided by a web browser.

In one embodiment, for example, the document editing subsystem 200 may use the latent transfer surface 130 to handle paste and paste special commands. In particular, the document editing subsystem 200 may implement the latent transfer surface 130 as a new HTML element on the document 128 rendered as a web page in a window 106 of the display 104. By programmatically placing focus into the latent transfer surface 130, a user action to trigger a paste command will place the media content into the latent transfer surface 130. The term "focus" refers to the location of an insertion point or current selection within a given document. The contents of the latent transfer surface 130 may be monitored to detect when the paste operation has occurred. When it does, the contents of the latent transfer surface 130 can be inspected, and transformed into a format suitable for the document 128. After the data has been transformed, it is inserted into the user's view of the document 128. In this manner, control over the media content that appears on the web page can be maintained, and information about the edits that have been made to the document 128 can be preserved.

In one embodiment, for example, the document editing subsystem 200 may also use the latent transfer surface 130 to handle copy, move and cut commands. When the user 102 selects some media content in the document 128 using an input device such as a keyboard or mouse, the document editing subsystem 200 determines what media content the user wants to select. The document editing subsystem 200 then changes the formatting of the selected media content to indicate that it was selected (e.g., blue background on text). The document editing subsystem 200 sets the contents of the latent transfer surface 130 to be a run of HTML code or other code that represents the exact data selected by the user 102. The document editing subsystem 200 programmatically sets the focus in the document 128 to point at the contents of the latent transfer surface 130. As a result, when the user 102 executes the copy command, the system clipboard 142 will be populated with the media content generated by the document editing subsystem 200.

Figure 2:
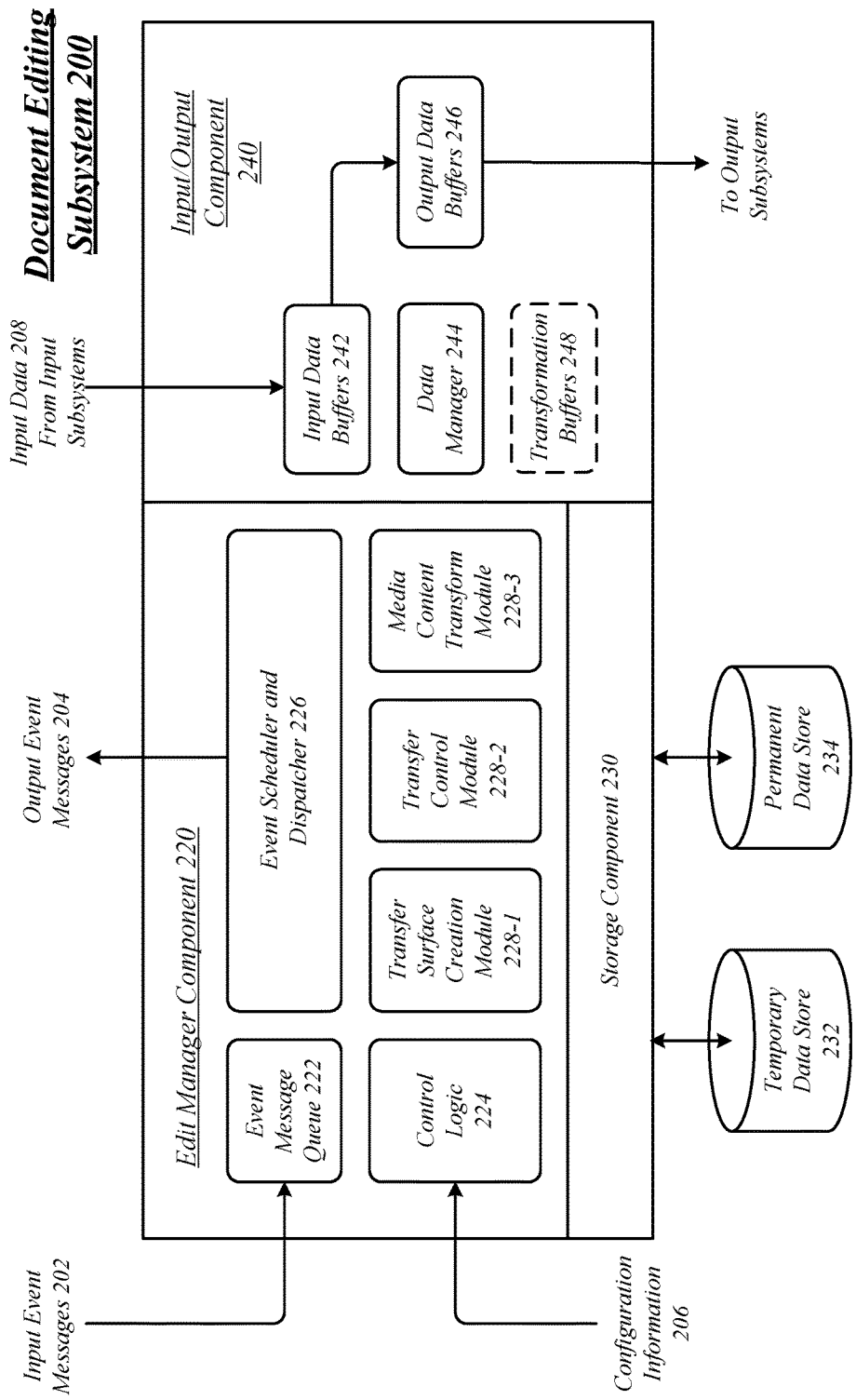
FIG. 2 illustrates an embodiment of a document editing subsystem.

FIG. 2 illustrates a more detailed block diagram of the document editing subsystem 200. The document editing subsystem 200 may comprise multiple components and/or modules. In the illustrated embodiment shown in FIG. 2, the document editing subsystem 200 may include an edit manager component 220, a storage component 230, and an input/output (I/O) component 240. The components and/or modules may be implemented using hardware elements, software elements, or a combination of hardware elements and software elements. Although the document editing subsystem 200 as shown in FIG. 2 has a limited number of elements in a certain topology, it may be appreciated that the document editing subsystem 200 may include more or less elements in alternate topologies as desired for a given implementation.

An edit manager component 220 may be arranged to receive various input event messages 202 at an event message queue 222. The event message queue 222 may comprise one or more queues for handling event messages. In one embodiment, for example, the event message queue 222 may handle event messages with distinct priorities. The event handling module 146 may use the event message queue 222 to process and handle the various event messages 202.

The edit manager component 220 may include control logic 224. The control logic 224 may be arranged to control operations of the edit manager component 220 based on configuration information 206. For example, the control logic 224 may execute an algorithm, logic flow or a state machine to perform various operations on input data received from various input subsystems in response to the various input event messages 202. The control logic 224 may process the input data based on the configuration information 206. The control logic 224 may also generate various output event messages 204, and send the output event messages 204 to an event scheduler and dispatcher 226.

The edit manager component 220 may include an event scheduler and dispatcher 226. The event scheduler and dispatcher 226 may be arranged to initiate events to other external entities, and dispatches internal events and messages within the edit manager component 220. For example, the event scheduler and dispatcher 226 to send various output event messages 204 responsive to the input event messages 202 to other systems, subsystems, components or modules of the system 100.

In one embodiment, the document editing subsystem 200 may include the storage component 230. The storage component 230 may be arranged with data stores and logic to manage storage operations for the edit manager component 220. The storage component 230 may store temporary or non-transacted information used by the edit manager component 220 in a temporary data store 232. For example, the temporary or non-transacted information may be stored as extensible markup language (XML), binary files, or some other format in the temporary data store 232. The storage component 230 may store persistent or transacted information used by the edit manager component 220 in a permanent data store 234. The data stores 232, 234 may comprise individual data stores, respectively, or multiple data stores comprising part of a larger data store array, such as a storage area network (SAN). Furthermore, the storage component 230 and the data stores 232, 234 may implement the appropriate data buffering and caching techniques and structures if needed to meet system latency and capacity parameters. The storage component 230 also manages operations for logging and auditing storage.

In one embodiment, the document editing subsystem 200 may include the I/O component 240. The I/O component 240 may be arranged with buffers and logic to manage transport and I/O operations in moving information throughout the document editing subsystem 200. For example, the I/O component 240 may include one or more input data buffers 242 to receive and store input data 208 from an input subsystem. One or more modules of the edit manager component 220 may process the input data 208 to form processed data, and send it to one or more output data buffers 246. The output data buffers 246 may be arranged to store and send output data to an output subsystem. A data manager 244 may implement logic and network interfaces (e.g., web service interfaces) to control and manage data collection services and data distribution services. The I/O component 240 may implement one or more transformation buffers 248 to transform the input data 208 and/or the processed data from one format, data schema or protocol, to alternate formats, data schemas, or protocols.

In general operation, the document editing subsystem 200 may implement various editing features for the application program 140 utilizing the web browser 122 executed by the computer 120. More particularly, the document editing subsystem 200 may use the latent transfer surface 130 to support the editing features. This may be accomplished using a number of editing modules 228-1-p. In the illustrate embodiment shown in FIG. 2, the editing modules 228-1-p may include a transfer surface creation module 228-1, a transfer control module 228-2, and a media content transform module 228-3. Although a specific number of editing modules 228-1-p are shown in FIG. 2 by way of example and not limitation, it may be appreciated that more or less modules may be implemented for various sets of innovation market operations as desired for a given implementation. The embodiments are not limited in this context.

The transfer surface creation module 228-1 may be generally operative to create and embed the latent transfer surface 130 in the document 128. The latent transfer surface 130 may be used as a temporary storage structure that allows the document editing subsystem 200 to control the import and export of media content to and from the web-based application program 140. The latent transfer surface 130 is an editable frame (e.g., an IFrame) which is controlled by the application program 140, but is not actually visible to the user 102 of the application program 140. The latent transfer surface 130 operates as an intermediate destination location for edit commands issued by the user 102, the web browser 122, an application program, or some other entity or object.

The transfer surface creation module 228-1 may create the latent transfer surface 130 at various stages. For example, the transfer surface creation module 228-1 may create the latent transfer surface 130 when the user 102 launches the application program 140. In another example, the transfer surface creation module 228-1 may create the latent transfer surface 130 when as the display renderer 124 renders the document 128 in the browser window 106. In either case, the application program 140 maintains a reference to the latent transfer surface 130 once created.

The latent transfer surface 130 may comprise any editable frame suitable for use with a given markup language used by the display renderer 124 to render the document 128 in the browser window 106 on the display 104 for presentation to the user 102. In one embodiment, for example, the latent transfer surface 130 may be implemented as a HTML IFRAME element, among others. Further, the latent transfer surface is hidden or invisible so the user 102 cannot view or perceive the editable frame while viewing the document 128 in the browser window 106.

The transfer control module 228-2 may be communicatively coupled to the transfer surface creation module 228-1. The transfer control module 228-2 may be generally arranged to control transfer operations for the document editing subsystem 200 using the latent transfer surface 130. In one embodiment, for example, the transfer control module 228-2 may receive a transfer request to transfer media content for the document 128 as intercepted by the event handling module 146. The transfer control module 228-2 may then coordinate transfer of the media content using the latent transfer surface 130 in response to the transfer request. Examples of transfer requests may include without limitation any suitable edit commands, such as copy transfer requests, cut transfer requests, paste transfer requests, paste special transfer requests, and so forth.

The transfer control module 228-2 may be operative to transfer the media content from the document 128 to the latent transfer surface 130 in response to a copy transfer request or a cut transfer request. The transfer control module 228-2 provides selection and copy support for the document editing subsystem 200. The transfer control module 228-2 tracks keyboard and mouse actions by the user 102 and processes them to determine what media content in the document 128 has been selected by the user 102. By way of contrast, conventional web browsers typically select the content for a web-based application program. The transfer control module 228-2 intervenes at this point, however, and maintains track of which objects (text, images, etc) on the document 128 the user 102 is attempting to select. The transfer control module 228-2 will visually display this to the user 102 in some perceptible manner, such as changing background colors on text, highlight a border around an image, and other appropriate graphics user interface (GUI) techniques.

At approximately the same time, the transfer control module 228-2 will render the selected media content into the latent transfer surface 130. This may be accomplished, for example, by creating the appropriate HTML tree inside of the latent transfer surface 130. This allows the application program 140 to render the media content in a manner compatible with the current formatting features used by a target endpoint. For example, assume the selection on the document 128 comprises a text run inside of a table. Depending on the target, the transfer control module 228-2 can optionally choose whether to include the surrounding table as part of the media content that is rendered in the latent transfer surface 130. For example, the transfer control module 228-2 can include the surrounding table when it is being used for logical association of elements on a page, exclude the surrounding table if it is being used for layout purposes only, and so forth.

Once the transfer control module 228-2 determines the rendering for the selected content stored by the latent transfer surface 130, the transfer control module 228-2 may use JAVASCRIPT code or some other suitable technique to instruct the web browser 122 to mark the media content as selected. Visually, this action is hidden from the user 102. Rather, the user 102 will see only the visual elements of selection indication as described above. At this point the user 102 can decide whether to issue a copy command or a cut command by pressing a keyboard shortcut, using the right-click context menu, the browser edit menu, and so forth. When the copy/cut command issues, the transfer control module 228-2 will transfer the transformed media content from the latent transfer surface 130 to the system clipboard 142. In this manner, the transfer control module 228-2 can be used to determine precisely what media content is delivered to the system clipboard 142, rather than being limited to the edit features provided by the web browser 122.

The transfer control module 228-2 may be operative to transfer the media content from a system clipboard to the latent transfer surface 130 in response to a paste transfer request, and transfer any transformed media content from the latent transfer surface 130 to the document 128. The transfer control module 228-2 provides paste and filtering support for the document editing subsystem 200. In a web browser 122 or stand-alone application program, the focus for the document 128 can only exist in one place at any given time. As previously described, the transfer control module 228-2 places focus inside the latent transfer surface 130 to allow for copy or cut operations. Similarly, the latent transfer surface 130 may also serve as a target for paste and paste special operations. When the user issues a paste or paste special command, the transfer control module 228-2 detects this occurrence by explicit notification or periodically examining the contents of the latent transfer surface 130. When the transfer control module 228-2 detects media content within the latent transfer surface 130, the transfer control module 228-2 may issue a directive for the media content transform module 228-3.

The media content transform module 228-3 may be communicatively coupled to the transfer control module 228-2. The media content transform module 228-3 may be generally operative to transform the media content stored by the latent transfer surface 130 from a first format to a second format. This may be accomplished, for example, using the data manager 244 and the transformation buffers 248.

Since the latent transfer surface 130 is a hidden element of the document 128, the user 102 does not initially view the media content immediately after an edit command has been given. This allows the media content transform module 228-3 time to translate or transform the media content within the latent transfer surface from a source format to a destination format. As a result, the application program 140 maintains control over the style and layout of the document 128 in response to a paste/paste special command, or the style and layout of the media content transferred from the document 128 to the system clipboard 142. The media content transform module 228-3 parses the media content transferred into the latent transfer surface 130, and translates the media content into an appropriate data representation of what that media content represents. For example, when text is transferred to the latent transfer surface 130, a TextRun-Node is created in memory. If the text in the pasted media content is formatted with the HTML <B> tag, which indicates bold text, the media content transform module 228-3 will set a property on the TextRunNode to indicate that the text renders as bold, and so on. This is done for all the various types of HTML nodes supported by the application program 140 in general, and the document editing subsystem 200 in particular. Once the transformation operation is completed, the media content transform module 228-3 notifies the transfer control module 228-2, which subsequently updates the actual document 128 to include the newly rendered media content in a manner viewable by the user 102.

By intervening in the middle of edit operations, the document editing subsystem 200 provides the opportunity to apply any formatting desired by the user 102 and/or the application program 140. For example, the transferred media content may be transformed to match the default look current implemented for the document 128, to strip out unwanted media content, and so on. In this manner, the application program 140 can maintain a strict control over the layout and formatting of the document 128.

Figure 3:
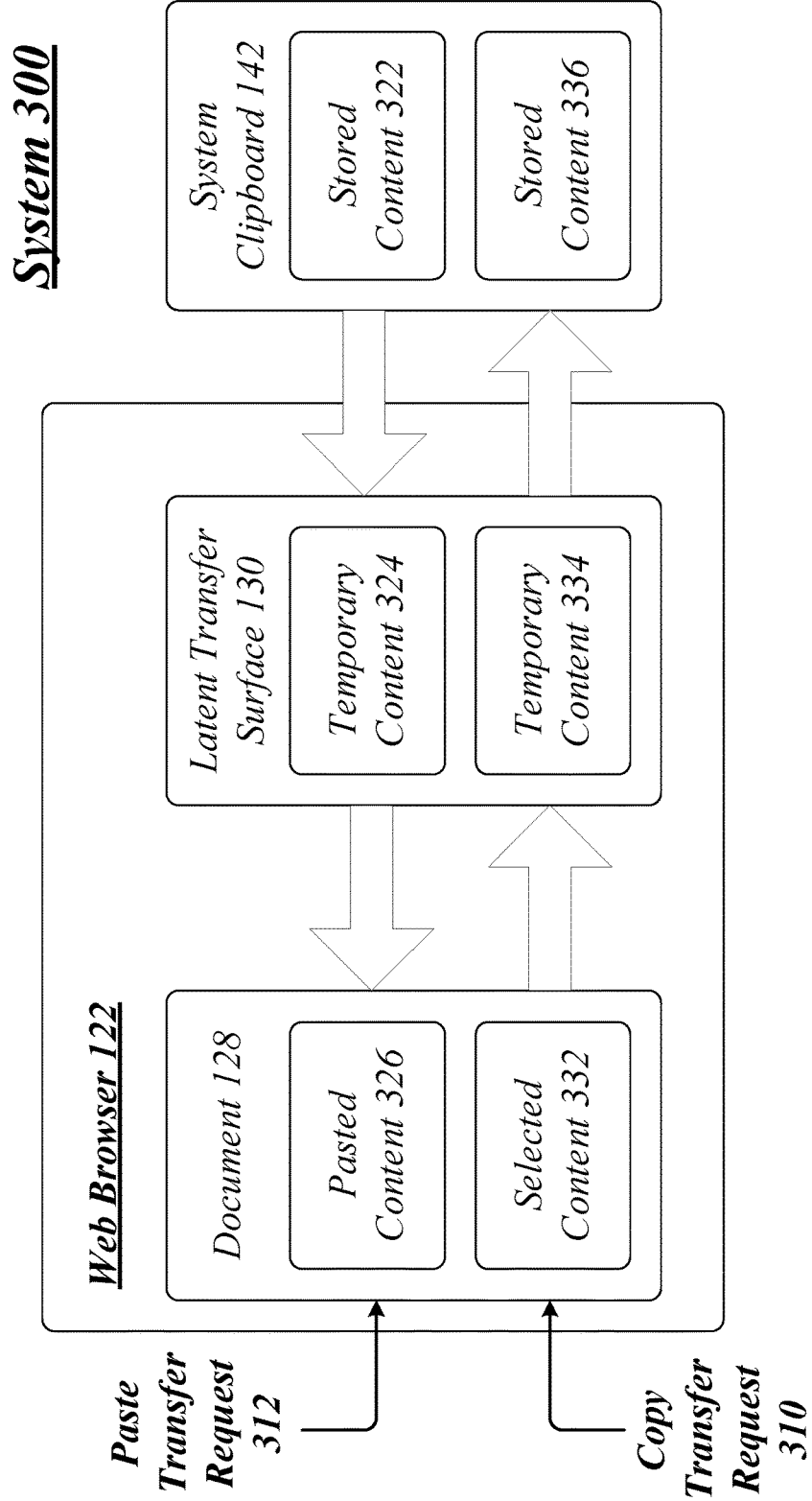
FIG. 3 illustrates an embodiment of a second system.

FIG. 3 illustrates an embodiment of a system 300. The system 300 illustrates a logical data flow between some of the elements involved in executing an edit command.

As shown in FIG. 3, the document editing subsystem 200 may receive a copy transfer request 310 for selected content 332 from the user 102 via the web browser 122. The transfer control module 228-2 may receive the copy transfer request 310, and transfer the selected content 332 from the document 128 to the latent transfer surface 130. The latent transfer surface 130 may store the selected content 332 as temporary content 334. Alternatively, the edit controls of the web browser 122 may be used to select and transfer the selected content 332. In this case, the document editing subsystem 200 may intercept the control directives from the web browser 122 via the event handling module 146. In either case, the transfer control module 228-2 may detect that the latent transfer surface 130 has media content that is ready for transformation, and notifies the media content transform module 228-3 accordingly.

The media content transform module 228-3 receives the notification from the transfer control module 228-2, and initiates transformation operations. The media content transform module 228-3 determines an appropriate format for the temporary content 334. This may be accomplished in a number of different ways. For example, the media content transform module 228-3 may store different transform modules corresponding to different target endpoints. The media content transform module 228-3 may determine the target endpoint for the temporary content 334, retrieve the corresponding transform module, and use the retrieved transform module to transform the temporary content 334 to different formats appropriate for the different target endpoints. This may be suitable when the media content is destined for various endpoints or when used with legacy systems. Additionally or alternatively, the media content transform module 228-3 may transform the temporary content 334 to a standard or universal format acceptable for all target endpoints. This may be suitable when the media content is destined for endpoints having the same capabilities. The media content transform module 228-3 may use the transformation buffers 248 to support transformation operations.

Once the transformation operations are complete, the media content transform module 228-3 notifies the transfer control module 228-2. The transfer control module 228-2 transfers the transformed media content to the target endpoint, such as the system clipboard 142. The system clipboard 142 now stores the stored content 336 in a format, such as a run of HTML code, designed to render the stored content 336 in a manner similar to the selected content 332 when originally copied or cut from the document 128.

Similarly, the document editing subsystem 200 may receive a paste transfer request 312 for stored content 322 from the user 102 via the web browser 122. The transfer control module 228-2 may receive the paste transfer request 312, and transfer the stored content 332 from the system clipboard 142 to the latent transfer surface 130. The latent transfer surface 130 may store the selected content 332 as temporary content 324. Alternatively, the edit controls of the web browser 122 may be used to transfer the stored content 322. In this case, the document editing subsystem 200 may intercept the control directives from the web browser 122 via the event handling module 146. In either case, the transfer control module 228-2 may detect that the latent transfer surface 130 has media content that is ready for transformation, and notifies the media content transform module 228-3 accordingly.

The media content transform module 228-3 receives the notification from the transfer control module 228-2, and initiates transformation operations. The media content transform module 228-3 determines an appropriate format for the temporary content 324. This may be accomplished in a manner similar to those described with reference to the copy transfer request 310, with some exceptions. Since the target endpoint for the temporary content 324 is the document 128 in this case, however, the media content transform module 228-3 may transform the different formats of the stored content 322 to the particular format currently used by the document 128. This may result in more many-to-one type of format transformation operations rather than many-to-many type of format transformation operations.

Once the transformation operations are complete, the media content transform module 228-3 notifies the transfer control module 228-2. The transfer control module 228-2 transfers the transformed media content to the target endpoint, such as the document 128. The document 128 then displays for the user 102 as pasted content 326 in a style and format compatible with the document 128.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may embed a latent transfer surface in a document at block 402. For example, the transfer surface creation module 228-1 may create and embed the latent transfer surface 130 in the document 128. This may occur during launch of the application program 140 or generation of a new document for the application program 140. The transfer creation module 228-1 may create a reference for the latent transfer surface 130, and pass the reference to the transfer control module 228-2.

The logic flow 400 may receive a transfer request to transfer media content for the document at block 404. For example, the transfer control module 228-1 may receive a transfer request (310, 312) to transfer media content (322, 332) for the document 128 to a target endpoint, such as the document 128, the system clipboard 142, or other endpoints. The transfer control module 228-1 may receive the transfer request from the web browser 122 via the event handling module 146.

The logic flow 400 may transfer the media content using the latent transfer surface in response to the transfer request at block 406. For example, the transfer control module 228-1 may transfer the media content (322, 332) using the latent transfer surface 130 in response to the transfer request (310, 312). In many cases, the media content (322, 332) may comprise transformed media content (324, 344) having a format compatible with the target endpoint (128, 142).

Figure 5:
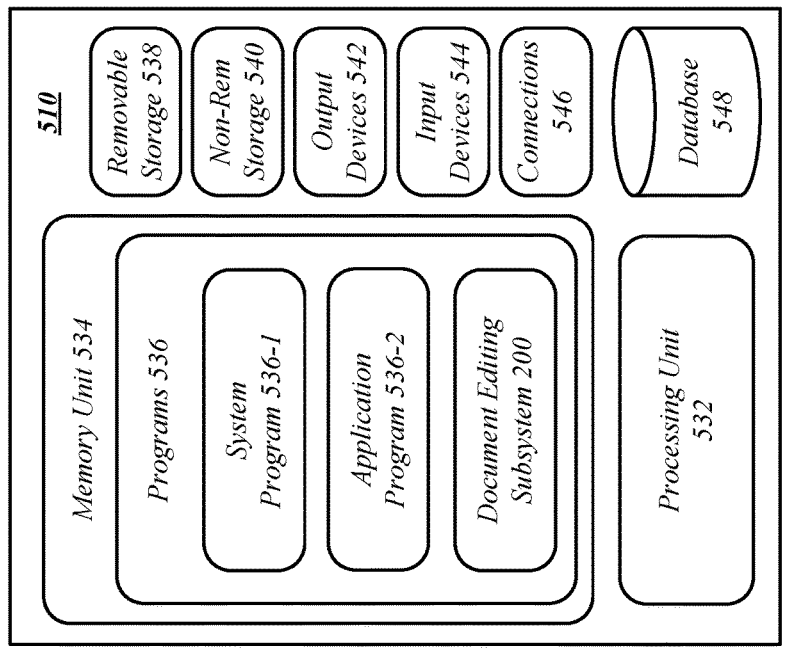
FIG. 5 illustrates an embodiment of a computing architecture.

FIG. 5 further illustrates a more detailed block diagram 500 of computing architecture 510 suitable for implementing various embodiments, such as computer 120, server computer 162, and so forth. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more software programs 536-1-t and accompanying data. Depending on the implementation, examples of software programs 536-1-t may include a system program 536-1 (e.g., an operating system), an application program 536-2 (e.g., the web browser 122, the application program 140, etc.), the document editing subsystem 200, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth and a database 548.

Computing architecture 510 may further include one or more communications connections 546 that allow computing architecture 510 to communicate with other devices. Communications connections 546 may be representative of, for example, the communications interfaces for the communications connections 546. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
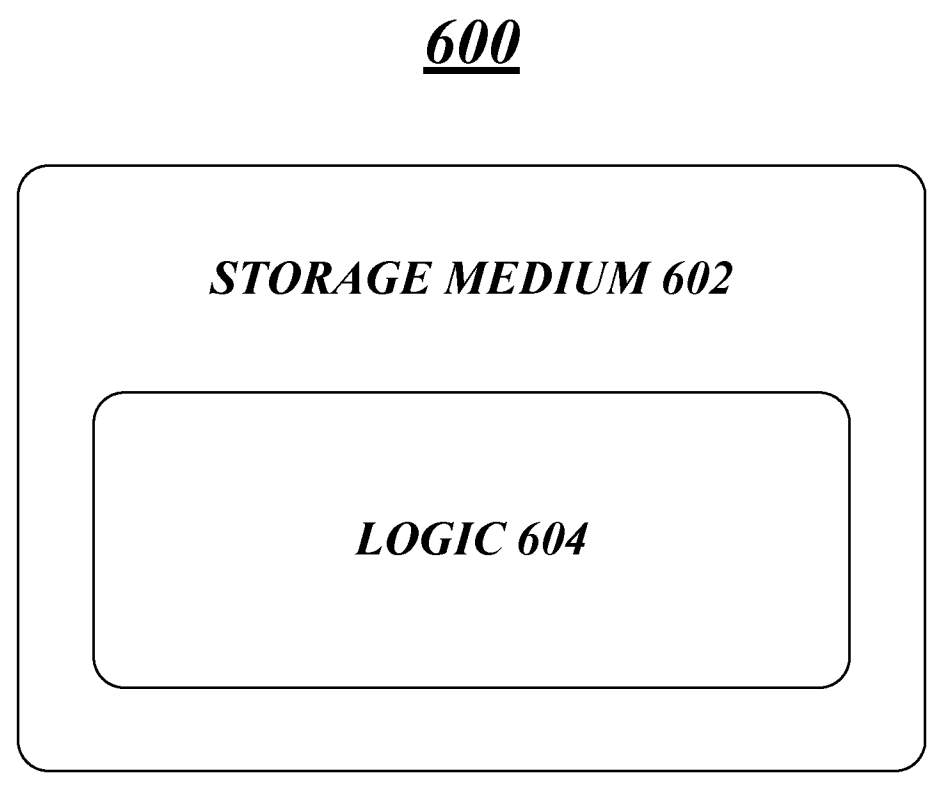

FIG. 6 illustrates a diagram an article of manufacture 600 suitable for storing logic for the various embodiments, including the logic flow 400. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, JAVA, BASIC, Perl, MATLAB, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by a computer having a processor, a memory, and a display operatively coupled to one another, the memory containing instructions executable by the processor to provide a system clipboard, the method comprising:

presenting, on the display, a document on the display to a user, the document having one or more content items;

detecting a user input to select a content item in the displayed document, the selected content item having a source format;

receiving, from the user, a transfer request to transfer the selected content item to the system clipboard; and in response to the received transfer request,
processing the identified content item in an editing facility embedded in the document presented on the display, the editing facility being invisible to the user in the document presented on the display, wherein processing the identified content item includes transforming the content item at the editing facility from the source format of the content item into a target format; and
transferring the content item transformed into the target format from the editing facility to the system clipboard.

2. The method of claim 1 wherein transforming the content item at the editing facility includes transforming at least a style, format, or layout of the content item.

3. The method of claim 1, further comprising temporarily storing the content item at the editing facility in the source format that is not compatible with the system clipboard prior to transforming the content item into the target format.

4. The method of claim 1 wherein receiving the transfer request includes receiving a copy request to copy the content item from the document to the system clipboard, or a cut request to move the content item from the document to the system clipboard.

5. The method of claim 1, further comprising transferring the content item from the document to the editing facility in response to the received transfer request that is a copy request or a cut request.

6. The method of claim 1 wherein:
the content item is a first content item;
detecting the user input includes detecting the user input simultaneously selecting the first content item and a second content item in the document;
processing the content item includes processing both the first and second content items at the editing facility embedded in the document;
transforming the content item includes transforming the first and second content items at the editing facility from the source format into the target format; and
transferring the content item includes transferring the first and second content items in the target format from the editing facility to the system clipboard.

7. A method performed by a computer having a processor, a memory, and a display operatively coupled to one another, the memory containing instructions executable by the processor to provide a system clipboard, the method comprising:
presenting, on the display, a document to a user;
receiving a transfer request from the user to transfer a content item on the system clipboard to the document presented on the display, the content item having a source format on the system clipboard; and
in response to the received transfer request from the user,
processing the content item from the system clipboard at an editing facility embedded in the document presented on the display, the editing facility being invisible to the user in the presented document on the display, wherein processing the content item includes transforming the content item at the editing facility from the source format into a target format compatible with the document presented on the display; and
outputting the transformed content item in the target format to the document presented on the display.

8. The method of claim 7 wherein transforming the transferred content item at the editing facility includes transforming at least a style, format, or layout of the content item.

9. The method of claim 7, further comprising temporarily storing the content item at the editing facility in the source format that is not compatible with the document presented on the display prior to transforming the content item into the target format.

10. The method of claim 7 wherein receiving the transfer request includes receiving a paste request to paste the content item from the system clipboard to the document presented on the display.

11. The method of claim 7 wherein receiving the transfer request includes receiving a request to paste the content item from the system clipboard to the document presented on the display, and wherein transferring the transformed content item includes transferring the transformed content item to the document presented on the display in response to the received paste request.

12. The method of claim 7, further comprising:
detecting a placement of an insert pointer at a location within the document presented on the display; and
wherein outputting the transformed content item includes outputting the transformed content item in the target format to the location within the document presented on the display.

13. The method of claim 7 wherein:
presenting the document to the user includes presenting the document in an application executed by the processor in the computing device; and
transforming the transferred content item includes performing a transformation of the content item at the editing facility from the source format into the target format compatible with the document presented on the display, and wherein the application does not include native capability to perform the transformation.

14. The method of claim 7 wherein:
presenting the document to the user includes presenting the document in an application executed by the processor in the computing device; and
the method further includes creating the editing facility when the application is launched or when the document is presented on the display.

15. The method of claim 7 wherein transferring the content item includes creating an hyper-text markup language tree representing the content item in the editing facility.

16. A computing device, comprising:
a processor; and
a display and a memory operatively coupled to the processor, the memory containing instructions executable by the processor to provide a system clipboard and perform a process comprising:
launching an application on the display;
presenting a document in the launched application on the display, the document including an editing facility that is embedded in the document and is invisible to the user in the presented document on the display;
receiving a transfer request to transfer a content item from the system clipboard to the document presented on the display; and
in response to the received transfer request,
retrieving the content item from the system clipboard to the editing facility embedded in the document;
transforming the retrieved content item in the editing facility embedded in the document from the source format into a target format compatible with the document presented on the display; and outputting the transformed content item in the target format to the document presented on the display.

17. The computing device of claim 16 wherein transforming the retrieved content item includes transforming at least a style, format, or layout of the content item.

18. The computing device of claim 16 wherein transforming the retrieved content item includes temporarily storing the content item at the embedded editing facility in the source format that is not compatible with the document prior to transforming the content item into the target format.

19. The computing device of claim 16 wherein receiving the transfer request includes receiving a paste request to paste the content item to the document from the system clipboard.

20. The computing device of claim 16 wherein:

the document has the target format; and receiving the transfer request includes receiving a request to paste the content item from the system clipboard to the document in the target format.

* * * * *